United States Patent [19]
Lawhon et al.

[11] Patent Number: 5,199,308
[45] Date of Patent: Apr. 6, 1993

[54] MULTI-FUNCTIONAL LEVEL PROBE MOUNTING DEVICE

[75] Inventors: Davie B. Lawhon, Furlong; James C. Rodgers, Pipersville; George H. Alexander, Jr., Hatfield, all of Pa.

[73] Assignee: Betz Laboratories, Inc., Trevose, Pa.

[21] Appl. No.: 637,099

[22] Filed: Jan. 3, 1991

[51] Int. Cl.⁵ .................... G01D 21/00; G01N 27/00
[52] U.S. Cl. ................................. 73/866.5; 324/450
[58] Field of Search ........... 73/866.5, 168; 137/559; 324/450; 204/228, 231, 250, 286, 287

[56] References Cited

U.S. PATENT DOCUMENTS

| | | | |
|---|---|---|---|
| 2,709,781 | 5/1955 | Douty et al. | 324/450 |
| 3,025,464 | 3/1962 | Bond | 73/866.5 |
| 3,037,928 | 6/1962 | Hass et al. | 204/250 |
| 3,151,052 | 9/1964 | Arthur et al. | 324/450 |
| 3,471,393 | 10/1969 | Ingruber | 324/450 |
| 4,096,754 | 6/1978 | Beveridge, Jr. et al. | 73/866.5 |
| 4,322,972 | 4/1982 | Karjala | 73/168 |
| 4,331,262 | 5/1982 | Snyder et al. | 222/644 |
| 4,605,501 | 8/1986 | Tyson | 137/559 |
| 4,703,664 | 11/1987 | Kirkpatrick et al. | 73/866.5 |
| 4,897,797 | 1/1990 | Free, Jr. et al. | 364/500 |

*Primary Examiner*—Hezron E. Williams
*Assistant Examiner*—George Dombroske
*Attorney, Agent, or Firm*—Alexander D. Ricci; Bruce E. Peacock

[57] ABSTRACT

A sensor mount is disclosed for use in a fluid volume measurement structure forming part of a fluid measurement system for feeding fluid in controlled amounts. The sensor mount includes a tubular body having first and second sensor mounting sockets whereby functionally different fluid sensors may be mounted to the tubular body. As fluid enters or exits the tubular body, a fluid sensor mounted in one or the other of the sensor sockets produces a signal to be used by a control portion of a fluid measurement system. The first sensor socket is provided as a through hole whereby a sensor may be mounted in fluid contact with the interior of the tubular body. The second sensor socket is provided as a blind hole for receiving a capacitance sensor out of fluid contact with fluids within the tubular body.

5 Claims, 4 Drawing Sheets

MULTI-FUNCTIONAL LEVEL PROBE MOUNTING DEVICE

BACKGROUND OF THE INVENTION

This invention generally relates to a mounting fixture for holding fluid level sensors, and more particularly, to a mounting fixture for holding a variety of functionally different fluid sensors in a fluid measurement and control system.

In known chemical treatment systems, such as the one disclosed in U.S. Pat. No. 4,897,797 to Free, Jr. et al, a fluid such as water is treated with a treatment liquid as it flows through a conduit, and the treatment liquid is fed in controlled amounts by a proportional feed technique. The treatment liquid is stored in a storage tank and is pumped to the conduit by means of a pump which displaces a predetermined volume of liquid per each stroke. Thus, by determining the volume displaced by the pump during each stroke, the particular amount of treatment liquid fed to the conduit may be precisely controlled by controlling the number of strokes of the pump with regard to the flow rate of the liquid flowing through the conduit.

As is noted in U.S. Pat. No. 4,897,797, the displacement of the pump must be calibrated periodically. To this end, an automatic calibration-measuring system is provided consisting of a hollow sight glass having first and second sensors arranged in vertical relationship to each other adjacent to the sight glass such that, as a pump pumps the treatment liquid into the conduit, the upper level of the fluid will pass and be detected by each of the sensors. By correlating the distance moved by the upper level of the treatment liquid between the two sensors to the number of strokes of the pump, the volumetric displacement of the pump per stroke may be calculated to thereby calibrate the treatment system.

The above-described measurement system has proven to be effective for providing a continuous means of calibrating the system while continuing to provide flow of the treatment fluid to the conduit carrying the fluid to be treated. However, difficulties have been encountered in accurately determining the location of the upper level of the treatment liquid within the sight glass when the treatment liquid is a highly viscous fluid. When a viscous fluid is being calibrated, it tends to coat the sides of the sight glass and thus interfere with accurately determining the air/liquid interface at the upper surface of the treatment liquid.

Accordingly, there is a need for a mounting fixture for use in conjunction with a fluid measurement and pump calibration system wherein the mounting fixture is adapted to mount functionally different sensors to accommodate fluids having different characteristics. In addition, there is a need for such a mounting fixture in which the fixture may be used to mount either the upper or lower fluid sensor in the fluid measurement system.

SUMMARY OF THE INVENTION

The present invention provides a fixture for mounting fluid sensors in a fluid volume measurement structure adapted to be used in a fluid measurement system for feeding fluid in controlled amounts from a storage tank into a conduit carrying a fluid to be treated.

The fluid volume measurement structure includes a container connected in fluid communication to the tank whereby fluid may be transferred from the tank to the container. The container is oriented vertically such that it defines an upper and a lower end, and first and second mounts are attached to the upper and lower ends of the container, respectively, for mounting a fluid sensing probe at each of the container ends.

Each of the mounts includes a hollow or tubular body having a first aperture for mounting a first fluid sensor in fluid contact with an interior portion of the mount, and a second aperture forming a blind hole in the wall of the mount for mounting a second fluid sensor out of fluid contact with the interior of the mount.

Each mount is further provided with third and fourth apertures for allowing fluid to enter and exit the mount wherein, in a first use of the mount, the third aperture of one of the mounts forms a fluid connection between that mount and the container and the fourth aperture of the other mount forms a fluid connection between that mount and the container. An optical probe may be positioned within the first aperture of each of the mounts to extend vertically upwardly through the first aperture into fluid contact with the interior of its respective mount.

In another use of the mount, the first aperture may be plugged and a capacitance sensor may be positioned in the second aperture out of fluid contact with the interior of the mount but in contact with a planar wall of the mount such that it may sense changes in capacitance as fluid fills or is emptied from the mount.

In an alternative use of the mount, the mount may be positioned such that the first aperture is oriented upwardly whereby a conductance probe may be positioned above the mount and extend downwardly through the first aperture into fluid contact with the interior of the mount.

The mount may be used with an optical probe when the treatment liquid is a non-oily fluid having either conducting or non-conducting properties. The capacitance probe may be used in situations where a non-conductive fluid having non-filming characteristics is being measured, and the mount may be used for the conductance probe when fluids having conductive properties are being measured.

Other objects and advantages of the invention will be apparent from the following description, the accompanying drawings and the appended claims.

DETAILED DESCRIPTION OF THE PREFERRED EMBODIMENT

Figure 1:
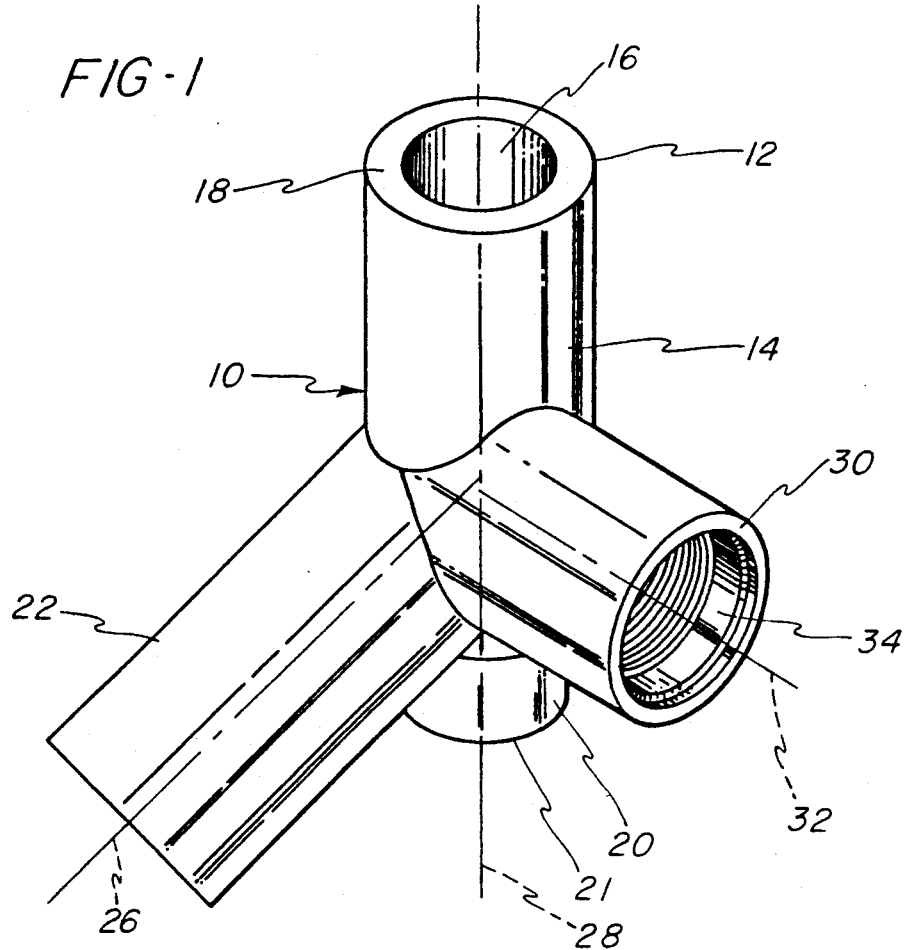
FIG. 1 is a perspective view of the sensor mount of the present invention.
Figure 2:
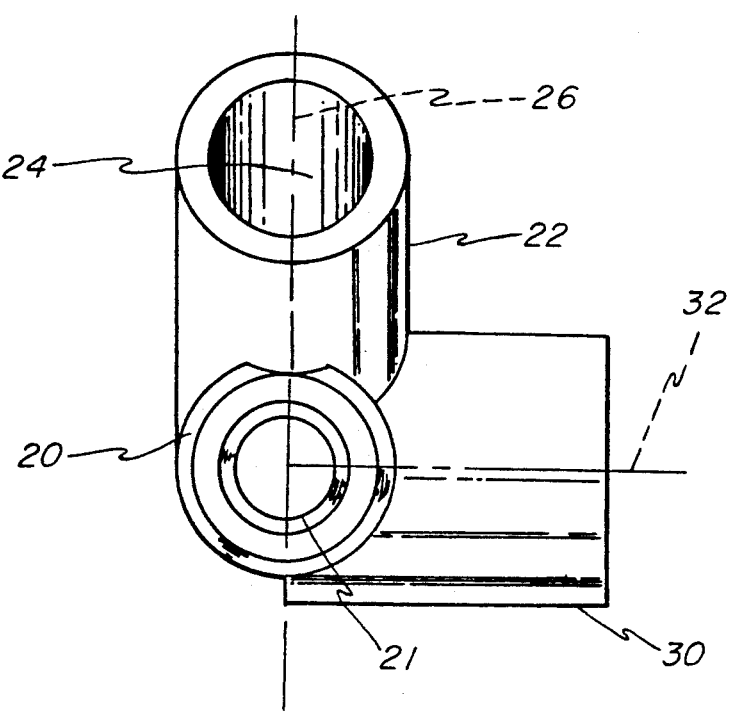
FIG. 2 is a bottom view of the sensor mount.

Referring to FIGS. 1 and 2, the mount or fitting 10 of the present invention is preferably formed of a dielectric material such as PVC plastic and includes a tubular body 12 having an outer wall 14 and an inner wall defining an aperture 16 through which fluid may enter and exit the mount 10.

A first end 18 of the tubular body 12 forms a passage for permitting fluid to enter and exit the mount 10 and a second end 20 is formed having a reduced diameter. A first threaded aperture 21 is formed in the second end 20 to define a first sensor socket.

A first cylindrical branch 22 is formed integrally with the body 12 and defines an aperture 24 (see FIG. 2) which extends into fluid communication with the aperture 16 such that fluid may enter and exit the body 12 through the cylindrical branch 22. The flow area of the aperture 24 is substantially equal to the flow area of the aperture 16. It should be noted that the cylindrical branch 22 defines a central longitudinal axis 26 which extends at an acute angle $\phi$ relative to a central longitudinal axis 28 of the body 12. Thus, fluid will flow from a lower portion to an upper portion of the mount 10, or vice versa, as it passes through the apertures 24 and 16 of the mount 10.

A second cylindrical branch 30 is formed integrally with the body 12 and defines a central longitudinal axis 32 which passes through and extends substantially perpendicular to each of the axes 26 and 28. The second cylindrical branch 30 defines an aperture 34 forming a blind hole on an outer portion of the mount 10. The aperture 34 acts as a second sensor socket and includes internal threads for engaging a threaded capacitance sensor. In addition, it should be noted that the aperture 34 terminates in a planar wall 36 (see FIG. 4) which is adapted to contact the end portion of a capacitance sensor in abutting engagement, as will be described further below.

Figure 3:
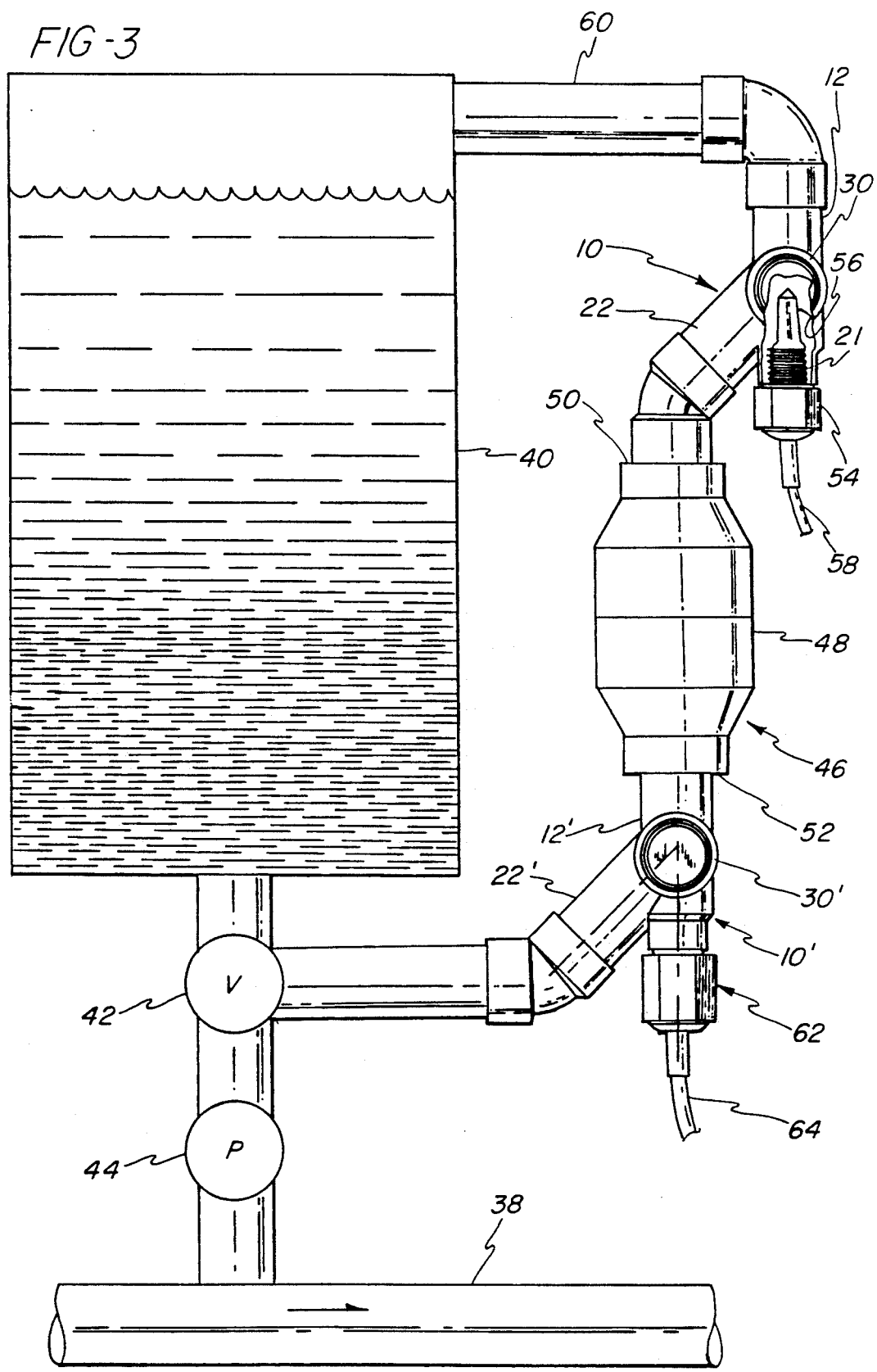
FIG. 3 is an elevational view showing a pair of sensor mounts in use with a fluid volume measurement structure in which one of the mounts is partially cut-away to show the position of an optical sensor.

Referring now to FIG. 3, the mount 10 of the present invention will be described with reference to its use in a fluid volume measurement structure such as is used in fluid measurement systems for feeding a treatment liquid in controlled amounts to a conduit 38 carrying a fluid to be treated. The fluid measurement system is substantially similar to that described in U.S. Pat. No. 4,897,797, which patent is incorporated herein by reference.

In general, the fluid measurement system includes a storage tank 40 containing the treatment liquid to be pumped into the conduit 38. A T-valve 42 is provided for alternately directing the treatment liquid directly to a pump from the tank 40 or to a fluid volume measurement structure 46.

The measurement structure 46 includes a container 48 which is in fluid communication with the tank 40 via the valve 42. The container 48 is oriented vertically and includes upper and lower ends 50, 52, and sensor mounts 10, 10' are attached in fluid communication with the ends 50, 52.

The mount 10 attached to the upper end 50 carries a first optical sensor 54 which is threadably received within the aperture 21 of the first sensor socket. The sensor 54 includes a probe portion 56 extending vertically upwardly into the tubular body 12 and therefore into fluid communication with any treatment liquid flowing through the mount 10. The optical sensor 54 may be of a commercially available type such as Model No. VP02E, sold by Electromatic Controls Corp. of Hoffman Estates, Illinois, and further includes a lead wire 58 to provide a signal to the measuring circuitry of a control system such as that shown in U.S. Pat. No. 4,897,797.

The mount 10 at the upper end 50 of the container 48 is attached such that liquid flow between the mount 10 and the container 48 will pass through the first cylindrical branch 22, and the upper end 18 of the tubular body 12 is connected to an upper air space portion of the tank 40 via a conduit 60.

The mount 10' attached to the lower end 52 of the container 48 is oriented in a manner similar to that of the mount 10 at the upper end 50 and mounts a second vertically oriented optical sensor 62 having a lead wire portion 64 for providing a signal to the measuring circuitry of a control system. Fluid flow between the valve 42 and the tubular body portion 12' of the lower mount 10' is conveyed through the first cylindrical branch 22', and fluid flow from the lower mount 10' to the container 48 takes place directly through the upper portion of the tubular body 12'.

The volumetric capacity of the container 48 and the connecting piping between the upper and lower sensors 56, 62 is known such that the fluid volume measurement structure 46 may be operated in the manner described in U.S. Pat. No. 4,897,797. Specifically, the valve 42 may be actuated to allow liquid to flow from the tank 40 and into the measurement structure 46 until the liquid is above the level of the upper end of the probe portion of the upper sensor 54. The valve 42 may then be actuated to allow the pump 44 to draw the liquid from the measurement structure 46 such that the number of pump strokes required to draw the liquid down from the level of the first sensor 54 to the level of the second sensor 62 may be determined. The number of pump strokes may then be correlated to the volumetric capacity of the system between the first and second sensors 54, 62 to provide an accurate determination of the stroke volume of the pump, as is fully described in U.S. Pat. No. 4,897,979.

The optical probe described above and depicted in FIG. 3 avoids the problems associated with the prior art means of sensing the fluid level in that the probe is provided with a pointed tip extending upwardly into direct contact with the fluid to be sensed such that highly viscous fluids will drain from the probe 56 quickly to provide an early indication of the absence of liquids. The optical probe senses the presence of fluid by emitting infrared light from the tip and sensing when light is reflected back into the tip. Thus, when no fluid is present, light will be transmitted from and reflected back to the tip. When a liquid is present, the refractive index at the interface between the probe tip and the liquid will be such that light emitted from the probe tip will not be received back to the probe, thus causing the sensor to send a signal indicating the presence of fluid.

It should be noted that the optical sensor incorporated in this embodiment is preferably used to sense non-reflective fluids. If a highly reflective fluid such as oil is being sensed, the fluid may cause the emitted light to reflect directly back into the sensor at the interface between the probe and the fluid such that the sensor will not provide an indication of the presence of the fluid.

Figure 4:
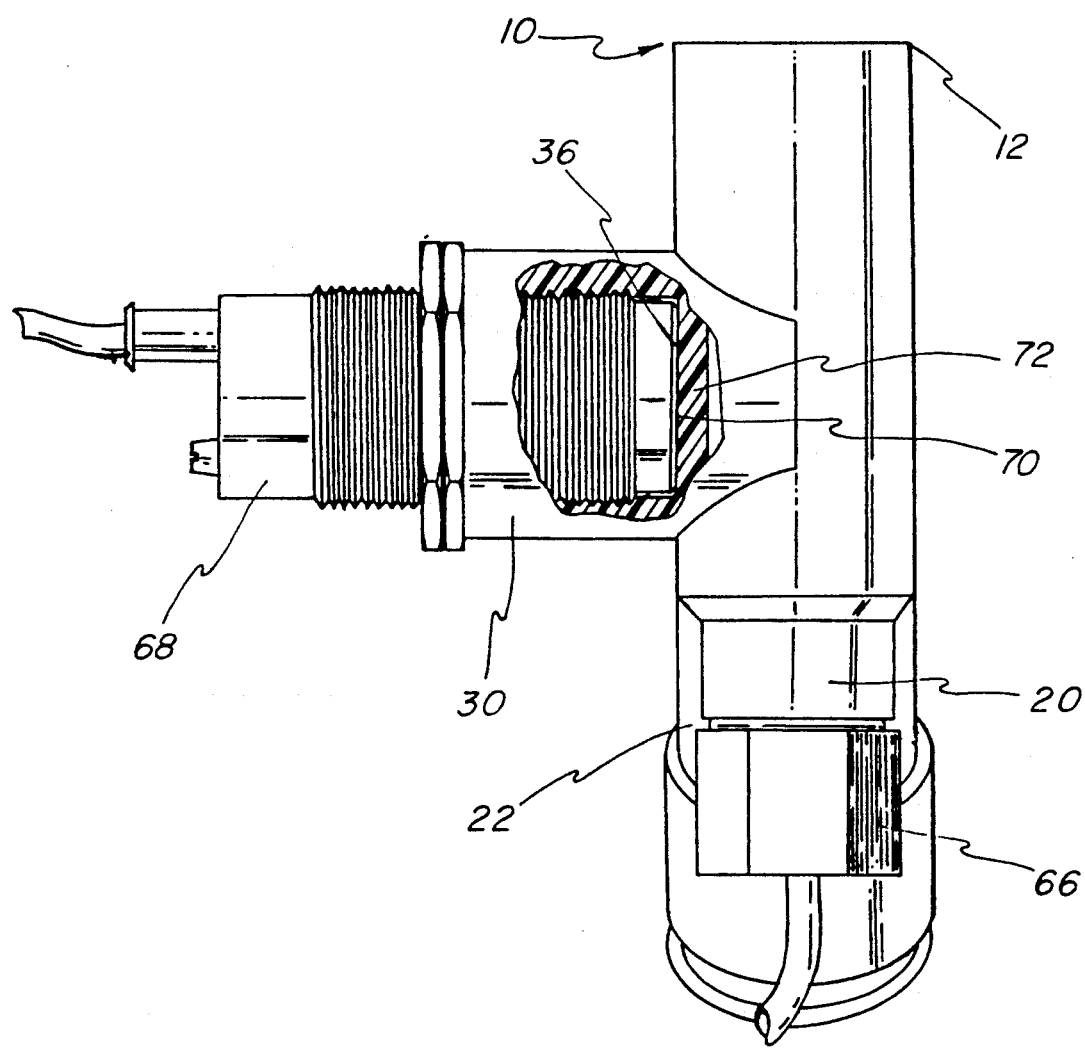
FIG. 4 is an elevational view of the sensor mount oriented similar to the sensor mounts of FIG. 2 and in which the mount is partially cut-away to show a capacitance sensor in position.

Referring to FIG. 4, an alternative embodiment for sensing fluid in the mounts 10, 10' of the embodiment of FIG. 2, is shown. In this embodiment, the first aperture 21 for receiving the optical sensor is blocked off with a plug 66, and a capacitance sensor 68 is threaded into the second sensor socket of the second cylindrical branch 30 of each of the mounts 10, 10' and includes a sensor lead wire portion 69 similar to the previous embodiments. The capacitance sensor 68 may be of a type which is commercially available such as Model No. EC3015NNAP sold by Electromatic Controls Corp., Hoffman Estates, Ill., and is oriented horizontally and includes a flat end 70 for abutting the planar wall 36 at the base of the blind hole formed in the cylindrical branch 30.

A wall portion 72 of the tubular body 12 forms the planar surface 36 and acts to isolate the capacitance probe 68 from fluids within the sensor mount 10. The conductance probe 68 works on the principle of sensing a change in the dielectric constant of the wall portion 72 as a result of fluid being present or absent from within the tubular body 12 at a location adjacent to the wall 72. Thus, it is essential that the planar wall 36 and the flat end 70 of the probe 68 contact each other along a substantial portion of the end face 70 to thereby accurately sense the presence of a fluid.

It should be noted that the embodiment incorporating the capacitance probe 68 is intended to be used mainly in conjunction with fluids which are non-conductive and non-filming since conductive filming fluids may form an electrical path along the sides of the mount 10 to the upper surface of the fluid when the fluid level is located below the sensor, thereby resulting in a false capacitance reading at the sensor.

Figure 5:
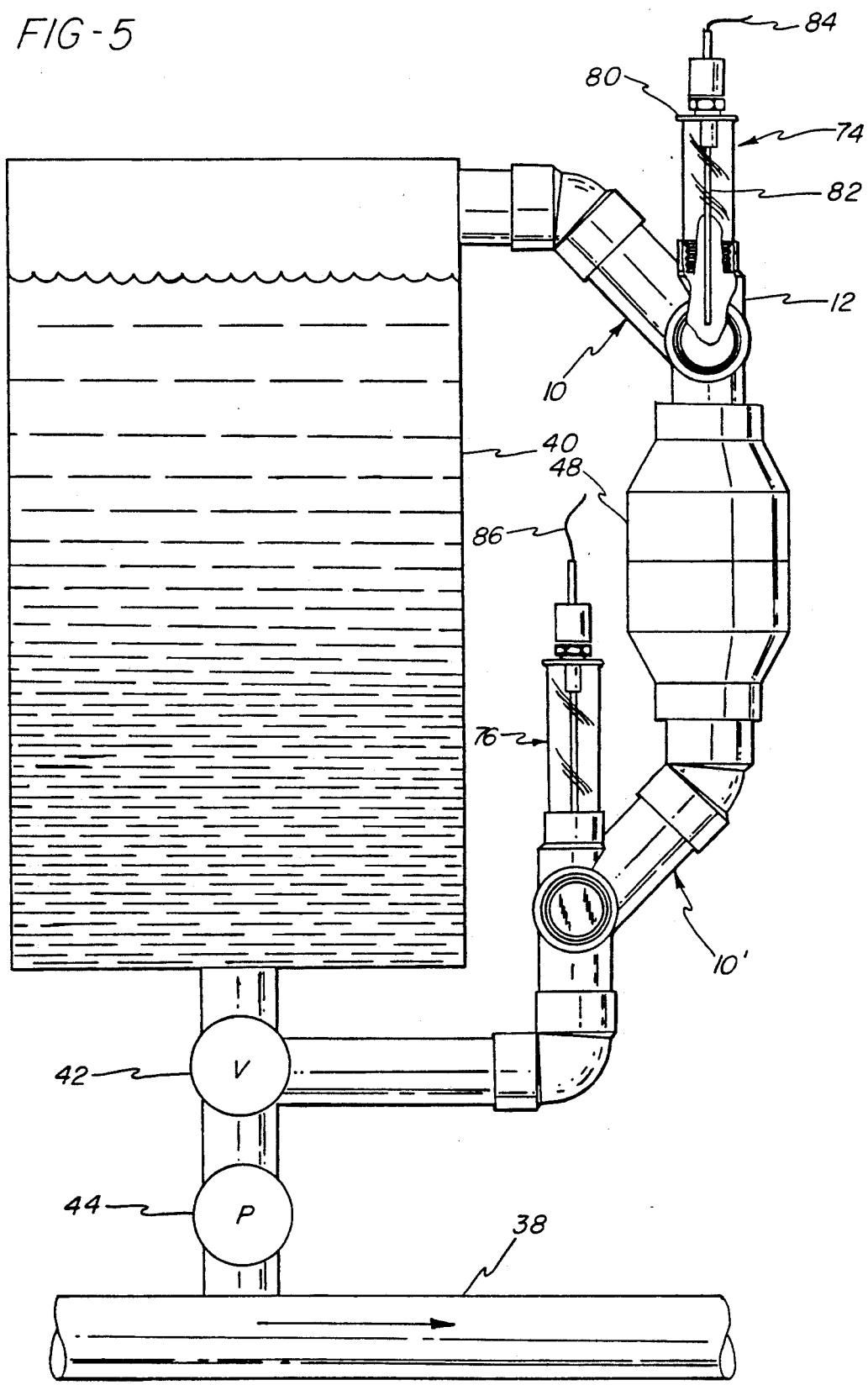
FIG. 5 is an elevational view similar to FIG. 2 in which the sensor mounts are inverted from the position of FIG. 2 and in which one of the mounts is partially cut-away to show the position of a conductance sensor.

In a third embodiment of the present invention, as shown in FIG. 5, the upper and lower sensor mounts 10, 10' are inverted from the orientation shown in FIGS. 3 and 4 such that the first sensor socket is located on top of the mount for receiving upper and lower conductance sensors 74, 76.

As may be seen in the cut-away view of the upper conductance sensor 74 in FIG. 5, the sensor 74 includes an elongated outer tubular or hollow wall 78 formed of a non-conductive material extending upwardly from the mount 10 and closed at an upper end thereof by a base portion 80, also formed of a non-conductive material. The base portion 80 supports an electrically conductive probe member 82 which extends downwardly out of contact with the wall 78 and into the interior of the tubular member 12 such that it may come into contact with fluid as it flows through the mount 10.

The wall 78 and base portion 80 define a hollow air chamber above the mount 10 wherein air contained within the chamber prevents fluid from passing up into the sensor and into contact with the base portion 80. In this manner, the formation of a conductive film between the conductive member 82 and the probe wall 78 along the base portion 80 is prevented to thereby prevent the possibility of a false reading being produced.

In addition, each of the sensors 74, 76 is provided with a lead wire 84, 86 for providing a signal to a controller as described in the previous embodiments. Further, it should be apparent that the present embodiment must be used to sense the presence or absence of a conductive fluid in order for the conducting sensor to produce a signal.

Thus, it should be apparent that the present invention provides a mounting which is adapted to be used with a plurality of fluid sensing probes which are functionally different from each other. In addition, the present mounting provides a convenient means for mounting one of several types of sensors depending on the particular characteristics of the fluid to be sensed.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a fluid measurement system for feeding fluid in controlled amounts from a tank to a treatment line, a fluid volume measurement structure comprising:
   a container connected to said tank such that fluid may be transferred from said tank to said container;
   said container comprising an upper end and a lower end;
   a first mounting means connecting said tank to said upper end of said container and having an interior portion defining a first flow passage;
   a second mounting means connecting said lower end of said container to said treatment line and having an interior portion defining a second flow passage;
   a first sensor aperture in said first mounting means for mounting a first fluid sensor in fluid communication with said first flow passage;
   a second sensor aperture in said second mounting means for mounting a second fluid sensor in fluid communication with said second flow passage;
   a third sensor aperture in said first mounting means for mounting a first liquid capacitance sensor therein, said third sensor aperture comprising a first planar wall surface contiguous to said first flow passage and adapted to block fluids in said first flow passage from entering said third sensor aperture, said first planar wall surface adapted for contacting a first capacitance sensor for sensing capacitance changes of liquid in said first flow passage; and
   a fourth sensor aperture in said second mounting means for mounting a second liquid capacitance sensor therein, said fourth sensor aperture comprising a second planar surface contiguous to said second flow passage and adapted to block fluids in said second flow passage from entering said fourth sensor aperture, said second planar wall surface adapted for contacting a second capacitance sensor for sensing capacitance changes of liquid in said second flow passage.

2. The fluid volume measuring structure of claim 1 including a conductance sensor extending downwardly within each of said first and second sensor apertures.

3. The fluid volume measuring structure of claim 2 wherein each said conductance sensor includes an elongated tube formed of a dielectric material, a base portion sealing said tube, and an elongated electrical conductor extending from said base portion to a location adjacent to one of said mounting means, said conductor being located in spaced relation to said tube.

4. The fluid volume measuring structure of claim 1 including an optical sensor extending upwardly within each of said first and second sensor apertures.

5. The fluid volume measuring structure of claim 1 wherein both said first and second mounting means are formed of a dielectric material.

* * * * *